(12) United States Patent
Koehler, Jr. et al.

(10) Patent No.: US 8,369,329 B2
(45) Date of Patent: Feb. 5, 2013

(54) DYNAMIC HIERARCHICAL ADDRESS RESOURCE MANAGEMENT ARCHITECTURE, METHOD AND APPARATUS

(75) Inventors: Edwin Koehler, Jr., Ontario, NY (US); John Yoakum, Cary, NC (US); Cherif Sleiman, East Amherst, NY (US)

(73) Assignee: Rockstar Consortium US LP, Plano, TX (US)

( * ) Notice: Subject to any disclaimer, the term of this patent is extended or adjusted under 35 U.S.C. 154(b) by 1276 days.

(21) Appl. No.: 11/325,064

(22) Filed: Jan. 3, 2006

(65) Prior Publication Data
US 2006/0256736 A1    Nov. 16, 2006

Related U.S. Application Data

(60) Provisional application No. 60/681,302, filed on May 16, 2005.

(51) Int. Cl.
*H04L 12/28* (2006.01)
*G06F 15/16* (2006.01)

(52) U.S. Cl. ......... 370/392; 709/223; 709/227; 709/245
(58) Field of Classification Search .................. None
See application file for complete search history.

(56) References Cited

U.S. PATENT DOCUMENTS

| | | | | |
|---|---|---|---|---|
| 5,586,267 | A * | 12/1996 | Chatwani et al. | 709/223 |
| 6,216,168 | B1 * | 4/2001 | Dev et al. | 709/245 |
| 2003/0026241 | A1 * | 2/2003 | Ono et al. | 370/349 |
| 2003/0154285 | A1 * | 8/2003 | Berglund et al. | 709/227 |
| 2003/0217175 | A1 * | 11/2003 | Mathew et al. | 709/238 |
| 2003/0233427 | A1 * | 12/2003 | Taguchi | 709/220 |
| 2004/0013113 | A1 | 1/2004 | Singh et al. | |
| 2004/0028040 | A1 * | 2/2004 | Kumar et al. | 370/389 |
| 2004/0122974 | A1 * | 6/2004 | Murakami | 709/245 |
| 2005/0076144 | A1 * | 4/2005 | Boylan et al. | 709/245 |
| 2006/0126629 | A1 * | 6/2006 | Dooley et al. | 370/392 |

OTHER PUBLICATIONS

RFC 3587, IPV6 Global Unicast Address Format, Hinden, Deering, Nordmark, Aug. 2003.*
International Search Report and Written Opinion form corresponding PCT application PCT/US06/18788 , Oct. 15, 2008, 8 pages.

* cited by examiner

*Primary Examiner* — Melanie Jagannathan
(74) *Attorney, Agent, or Firm* — Anderson Gorecki & Rouille LLP

(57) ABSTRACT

A Dynamic Hierarchical Address Resource Management Architecture (DHARMA) coordinates a logical hierarchy of address spaces with a virtual topology of network elements using a manageable database environment. Address spaces are apportioned into hierarchical levels in accordance with a network policy. Network elements may be represented as objects, coupled via the logical address space. Both address space hierarchy definition and virtual topology modelling may occur independent from actual network deployment. As a result, multiple address space hierarchy definitions and virtual topologies can be pre-generated and stored for selective use during network deployment. With such an arrangement, a flexible addressing architecture is provided which may advantageously be used in any network that desires dynamic network configuration. The connection between the logical address hierarchy and the virtual network topology may advantageously be implemented through the use of a logical tag that links a virtual network element to a logical address hierarchy level.

19 Claims, 13 Drawing Sheets

Unique Local routing prefix of FC00:4D:C00/38

Starting values:
F = 0x4D0C00
x = 38
s = 3
w = 24
f = 38 − 24 = 14
n = $2^3$ = 8
i = $2^{24-(14+3)}$ = 128 dec = 0x80 hex)
L = 38 + 3 = 41

| Network Prefix Number | Network Prefix ID | Subnetted Network Prefix |
|---|---|---|
| 1 | 4D0C00 | FC00:4D:C00::/41 |
| 2 | 4D0C80 | FC00:4D:C80::/41 |
| 3 | 4D0D00 | FC00:4D:D00::/41 |
| 4 | 4D0D80 | FC00:4D:D80::/41 |
| 5 | 4D0E00 | FC00:4D:E00::/41 |
| 6 | 4D0E80 | FC00:4D:E80::/41 |
| 7 | 4D0F00 | FC00:4D:F00::/41 |
| 8 | 4D0F80 | FC00:4D:F80::/41 |

Figure 6

DYNAMIC HIERARCHICAL ADDRESS RESOURCE MANAGEMENT ARCHITECTURE, METHOD AND APPARATUS

RELATED APPLICATIONS

This application claims priority under 35 U.S.C. §1.119(e) to provisional patent application serial number 60/681,302, filed May 16, 2005 and incorporated herein by reference.

FIELD OF THE INVENTION

This invention relates to methods and apparatus for address resource management and in particular to dynamic hierarchical address resource management methods and architectures.

BACKGROUND TO THE INVENTION

The Internet Protocol (IP) is the method or protocol by which data is sent from one computer to another on the Internet. Each computer (known as a host) on the Internet has at least one IP address that uniquely distinguishes from all other computers on the Internet. Data is exchanged in the form of packets, with each packet including both the sender's IP address and the receiver's IP address.

As the Internet has grown and evolved, different versions of the IP protocol have been developed to support the changing needs of the Internet. One element of the IP protocol is the mapping of the bits of a packet to different control fields within the packets. For example, version 4 of the IP protocol (IPv4) allocates 32 bits to each of the source and destination IP addresses in the packet. As a result there are $2^{32}$ available host addresses in an IPv4 network. However, in the face of a huge growth in the Internet, the number of hosts requiring IPv4 addresses may quickly exceed the available IP address supply.

Version 6 of the IP protocol (IPv6) was introduced to overcome some of the limiting elements of IPv4. One improvement of IPv6 protocol is the extension of IP addresses from 32 bits to 128 bits. As a result, the IPv6 addresses are 128 bits in length, resulting in $2^{128}$ (which is 3.4×1038) IPv6 addresses.

The large address space of the IPv6 can be made more manageable by the introduction of hierarchies, to reduce the size of routing tables and ease address management issues. There are recommendations within the standards committees that the deployment of IPv6 be done in such a way as to create a route summarization hierarchy. There are two main reasons for this; First, effective hierarchies greatly reduce the route table size to support the network. Second, hierarchies allow for quicker, more effective L3 convergence of major trunks during topology changes as well as allow for more effective summarized route policies.

One IPv6 hierarchy structure is defined in Internet Engineering Task Force (IETF) Request for Comments 3587 (RFC3587). RFC3587 defines a Global Unicast Address Format which includes three fields associated with three different levels in the Global Unicast Address hierarchy: a Public topology field, a Subnet (or Site) topology field and an Interface Identifier field. The Public topology field provides an address space for a collection of providers and exchanges of public Internet transit services. The Site topology field provides a local address space for a specific site or organisation which does not provide public internet transit service to nodes outside of the site. The Interface Identifier field provides addresses of different interfaces on links. Within the address space defined by the Subnet topology field, an organization can decide whether they locally want a flat structure or whether they require further levels in the hierarchy. Thus the hierarchy at the Subnet level is not defined by standards but selected by the organisation in accordance with their needs.

Host devices in an IPv6 network obtain addresses using either a stateful or stateless address auto-configuration mechanism. Stateless auto-configuration requires no manual configuration of hosts; rather the stateless mechanism allows a host to generate its own addresses using a combination of locally available information and information advertised by routers. Routers advertise prefixes that identify the subnet(s) associated with a link, while hosts generate an "interface identifier" that uniquely identifies an interface on a subnet. An address is formed by combining the two.

In the stateful autoconfiguration model, hosts obtain interface addresses and/or configuration information and parameters from a server, such as a Dynamic Host Control Protocol (DHCP). DHCP servers maintain a database that keeps track of which addresses have been assigned to which hosts. The stateful auto-configuration protocol allows hosts to obtain addresses, other configuration information or both from a server. Stateless and stateful auto-configuration complement each other. For example, a host can use stateless autoconfiguration to configure its own addresses, but use stateful auto-configuration to obtain other information. Network security can be enhanced in an IPv6 network through dynamic reconfiguration using the auto-configuration mechanisms described above.

One problem with dynamic reconfiguration and auto-configuration is that, while there are documented procedures for auto-configuration of hosts based on both stateless and stateful methods, these methods assume the presence of an IPv6 router that will either provide the correct IPv6 prefix that the host will use or indicate a managed state addressing environment (DHCPv6) for host use. However, there are no consistent methods for the allocating IPv6 addresses to routing elements. As a result, router IPv6 addresses are typically manually assigned, either by direct Command Line Interface (CLI) configuration or by off-line configuration edits. While manual assignment may be used to manage addresses in small, relatively static networks, it is not a feasible solution for larger more dynamic networks.

The management and allocation of hierarchical addresses to achieve an effectively designed IPv6 network complicates network deployment; In order to leverage the benefits of hierarchical routing, a network designer must figure out the whole addressing hierarchy prior to addressing any of the routing elements in the network topology. This is a computationally simple but repetitive task that is not based in 'human friendly' mathematics. Consequently, this approach is not only extremely time consuming, it is also very much prone to human error. In large, mission critical dynamic deployments any such inconsistencies would need to be discovered and resolved in the field. Given that among the many predicted uses for dynamic IPv6 deployments, one of them is the 'networked battlefield', such configuration errors could cost lives.

To address these problems, broker systems have been developed that are focused on the setup of IPv6 configured tunnels by standards based methods. The assignment of IPv6 prefix addresses happens as a necessary function in the setup of the IPv6 transition environment. While this approach works, it only works for tunnel brokered deployments and within the address range offered by the brokered system, because the assignment of prefixes is predicated on the presence of a pre-established tunnel. In other words, prefix assignment is an explicit process, and thus this solution has similar drawbacks to other types of manual assignment mechanisms.

SUMMARY OF THE INVENTION

A Dynamic Hierarchical Address Resource Management (DHARMA) architecture may be viewed from a number of different aspects. According to one aspect of the invention, a method of allocating addresses to devices in a network includes the steps of apportioning an address space associated with the network into a plurality of hierarchical levels and generating a virtual topology map of the network, the virtual topology map comprising a plurality of virtual network objects, each virtual network object including a tag and prefix information associated with one of the plurality of hierarchical levels of the address space.

According to another aspect of the invention, an apparatus for allocating addresses to devices in a network includes a logical address hierarchy tool enabling a user to apportion an address space into a plurality of hierarchical levels and a virtual network topology generator enabling a user to build a virtual network topology comprising a plurality of network element objects, each network element object including a tag linking the object to one of the plurality of hierarchical levels.

According to another aspect of the invention, an address space mapping apparatus for use in building an address space hierarchy comprised of a plurality of levels is described, wherein each level has a selected address space granularity. The apparatus includes a user interface and a prefix generator, coupled to the user interface for receiving hierarchy information including hierarchy level information and address space granularity information from a user, and for enumerating prefixes for each level in the address space hierarchy in response to the hierarchy level information and address space granularity information. The apparatus also includes a storage device, coupled to the prefix generator, for storing the enumerated prefixes as a logical address space hierarchy map.

According to another aspect of the invention, a method for generating a virtual network topology includes the steps of populating a plurality of routing element objects with attribute information, the attribute information of each routing element object including a tag associating the each routing element object with a level in an address space hierarchy.

According to a further aspect of the invention, a device includes a computer readable medium having a data structure stored thereon, the data structure comprising a plurality of routing element objects, each routing element object including a tag associating the each routing element object with a level in an address space hierarchy.

According to another aspect of the invention, a method of obtaining an address prefix for a network element seeking membership in a network includes the steps of receiving a bootstrap request from the network element, the bootstrap request including a bootstrap prefix and a Media Access Control (MAC) address of the network element, indexing a translation table using the MAC address to retrieve a tag associated with a virtual representation of the network object, the tag linking the virtual representation of the network object to one of a plurality of levels in an address hierarchy of an address space of the network; and forwarding the tag to a prefix server to retrieve one or more prefixes associated with the tag.

According to another aspect of the invention, a policy manager includes a translation table for converting a MAC address received from the network element to a tag, the tag identifying a virtual routing element object in a virtual topology and means for forwarding the tag to a prefix server to retrieve one or more prefixes for the network element.

BRIEF DESCRIPTION OF THE DRAWINGS

An embodiment of the invention will now be described with reference to the accompanying drawings in which:

FIG. 6 illustrates an enumerate prefix table that may be generated using the process of FIG. 4;

DETAILED DESCRIPTION OF INVENTION

According to one aspect of the invention, a Dynamic Hierarchical Address Resource Management Architecture (DHARMA) coordinates a logical hierarchy of address spaces with a virtual topology of network elements using a manageable database environment. Address spaces may be apportioned into hierarchical levels in accordance with a network policy. Network elements may be represented as objects, coupled via the logical address space. Both address space hierarchy definition and virtual topology modelling may occur independent from actual network deployment. As a result, multiple address space hierarchy definitions and virtual topologies can be pre-generated and stored for selective use during network deployment. With such an arrangement, a flexible addressing architecture is provided which may advantageously be used in any network that desires dynamic network configuration. The connection between the logical address hierarchy and the virtual network topology may advantageously be implemented through the use of a logical tag that links a virtual network element to a logical address hierarchy level. Mapping a network element to an address space level using a logical tag, rather than an explicit physical address, facilitates dynamic switching between various secure and controlled concurrent addressing hierarchies and supports seamless, policy based prefix renumbering.

Figure 2:
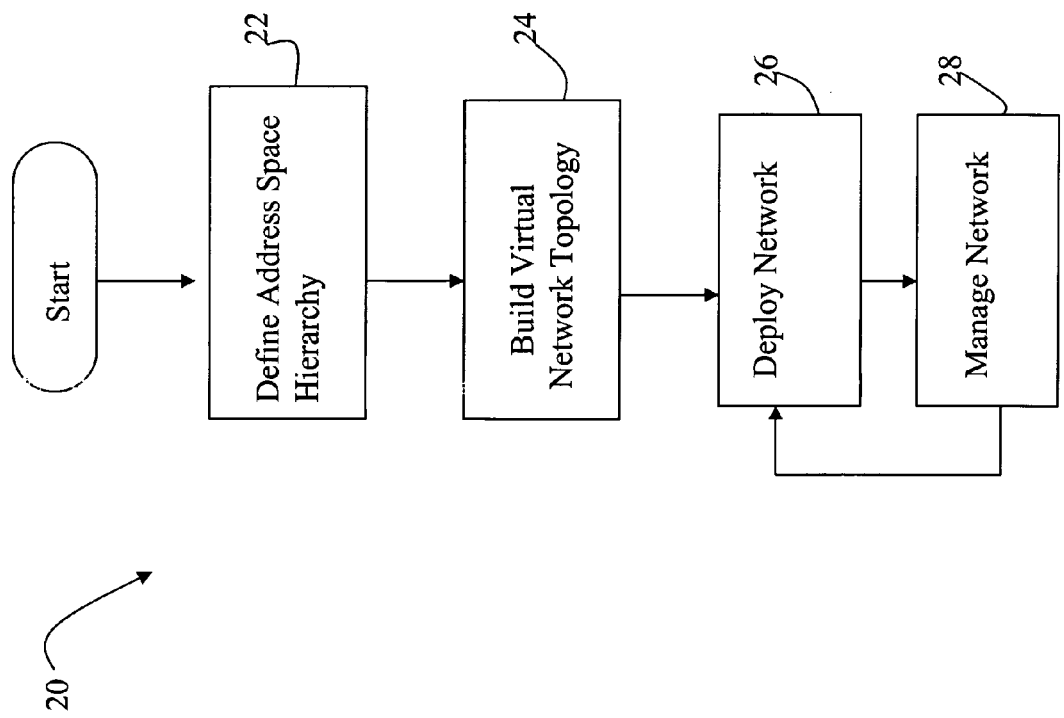
FIG. 2 is a flow diagram provided to illustrate several components in the DHARMA process.

In one embodiment of the invention, the coordination between network elements and logical address spaces is realized using the process 20 illustrated in FIG. 2. The process includes a logical address space management component 22, a virtual network topology design component 24, a network deployment component 26 and a network management component 28. Each of the components is described in more detail below. For illustrative purposes only various aspects of the DHARMA architecture are described with reference to the IPv6 protocol. However, as is evident from the below description, the IPv6 is only one example of a protocol which benefits from the DHARMA solution and the present invention is not limited to any particular addressing protocol or address space definition.

1. Logical Address Space Management Component

The logical address space management component is a tool that enables a network administrator to define address levels within the available address space. Using a graphical user interface, a network administrator is able to generate one or more address space hierarchy maps defining the division of the address space into a logical hierarchy of sub-nets. According to one aspect of the invention, each sub-net hierarchy may be defined in accordance with a network policy. Different address space hierarchy maps may be pre-generated and stored to reflect changing network policies, or to address network security concerns. Thus, the collection of address space hierarchy maps may be used to provide a contextual mapping of network policies to the overlay of concurrent address hierarchies (multi-netting), or for network prefix re-numbering.

The definition of address levels within an address space is thus a matter of design choice, and multiple logical address hierarchy maps may be maintained to be used in accordance with the current requirements of the network. The present invention may be used to define address levels within one or more portions of an address space, including, for example, both global and site specific address spaces, and may be used either in place of, or in conjunction with, existing address space allocation definitions.

Figure 1:
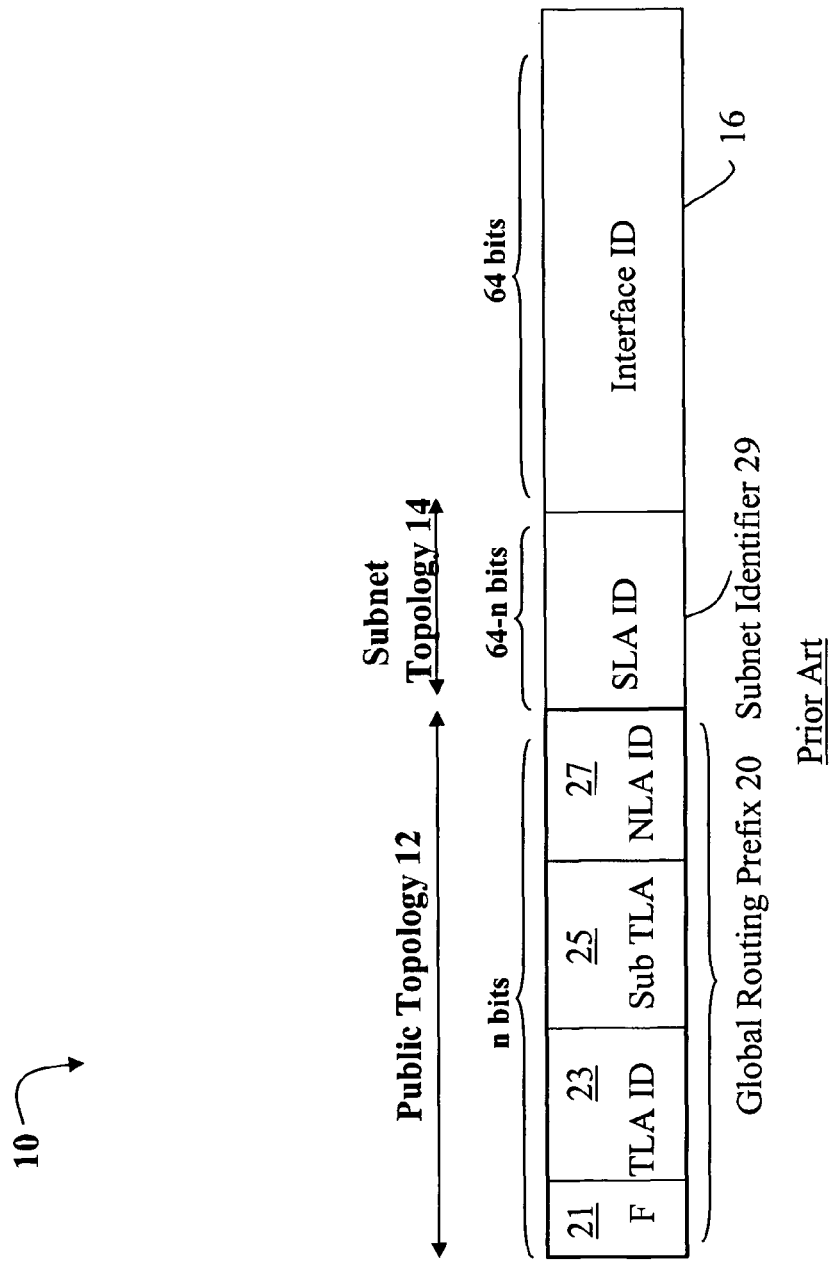
FIG. 1 is a diagram illustrating the allocation of bits in an IPv6 address.

For example, FIG. 1 illustrates an IPv6 Global Unicast Address apportioned in accordance with the Global Unicast Address hierarchy 10 described in RFC 3587. The Global Unicast Address hierarchy 10 includes three levels; a Public topology 12, a Subnet (or Site) topology 14, and an Interface Identifier. An IPv6 address is comprised of 128 bits apportioned into a global routing prefix 20, a subnet identifier 29 and an interface identifier 16. The interface identifier 16 is a fixed 64 bit field, while the global routing prefix 12 and subnet identifier 14 are mapped into the remaining 64 bits of the IPv6 address. The public topology is a collection of providers and exchanges that provide the public internet services.

The global routing prefix 20 is issued by a coordinated allocation policy, as described in RFC 2050, wherein Regional or Local Internet Registries allocate global routing prefixes to each provider or exchange in the IPv6 network. As defined in RFC 2373, the global routing prefix is a global aggregatable unicast address designed to support both the provider based aggregation and exchanges to allow efficient routing aggregation for both sites which connect directly to providers and those that connect to exchanges. Sites may choose to connect to either type of aggregation point. The IPv6 aggregatable global unicast address format is shown in FIG. 1 to include a Format field F 21, a Top-Level Aggregation Identifier 23, Reserved fields RES 25, a Next-Level Aggregation Identifier 27 and a Site Level Aggregation Identifier (SLA) 14. The provision of a two level TLA/NLA hierarchy allows some control to be implemented over IPv6 address distribution, but is inherently limited in its flexibility.

Figure 3A:
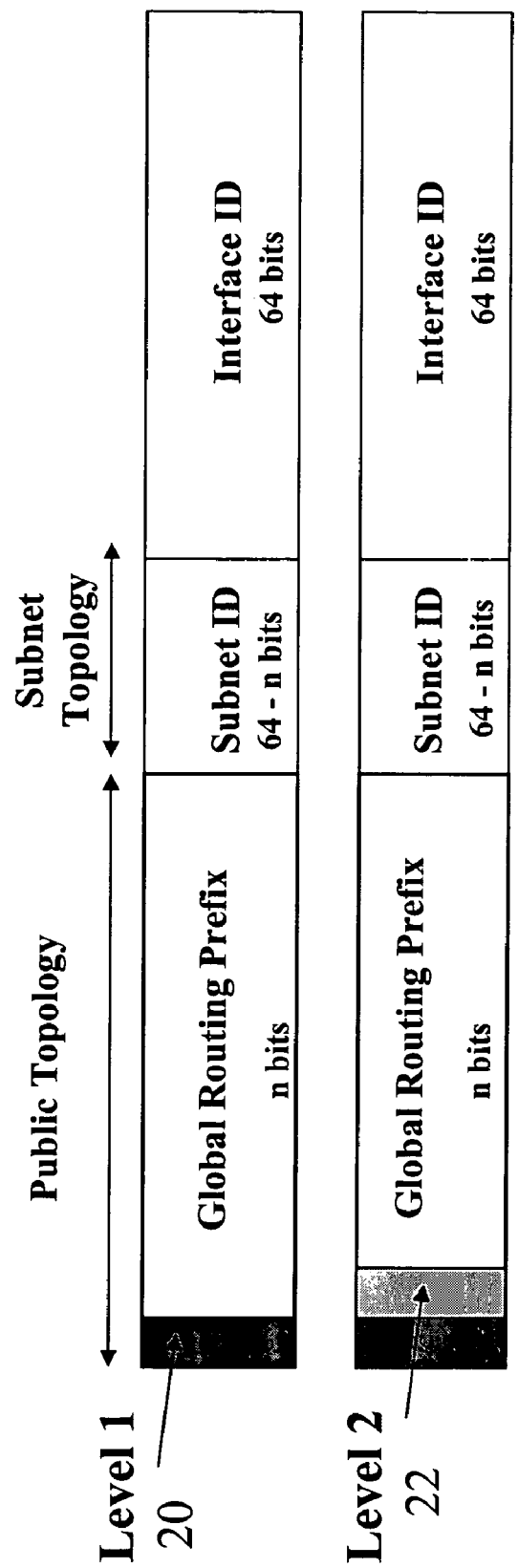
FIGS. 3A and 3B are a diagrams provided to illustrate allocations of addresses in respective IPv6 public topology and organization topology address spaces to levels in a logical address space hierarchy.

The present invention increases the ability of any network address space administrator to define both the number of levels in an address space hierarchy as well as the granularity of address space allocated to each of the respective levels in the hierarchy. The present invention may be used when defining address space allocation for either or both of a public or site topology, and provides significant benefits over the prior art methods of address allocation. For example, rather than be limited to address ranges available with TLA and NLA identifiers, the present invention allows the network administrator of an address space (such as a RIR for global unicast address space) to define a working range of addresses for the address space. Within the working range of addresses, a series of levels can be defined which correspond to the allocated bit offsets selected during level definition by the network administrator. FIG. 3A illustrates the allocation of bits to different levels of a hierarchy in a global unicast address space. A subset of bits 20 are allocated to Level 1 in the hierarchy of global unicast addresses, and a subset of bits 22 are allocated to Level 2 in the hierarchy of global unicast addresses. As will be described in more detail later herein, different devices in the IPv6 network are associated with different levels in the hierarchy. Devices linked to Level 1 of the hierarchy are assigned addresses from the range of available addresses defined by address bits 20, while devices linked to Level 2 of the hierarchy are assigned addresses defined by address bits 22. In one embodiment, an organization receiving a global routing prefix may also choose to use the prefix space to support other organization identifiers.

Figure 3B:
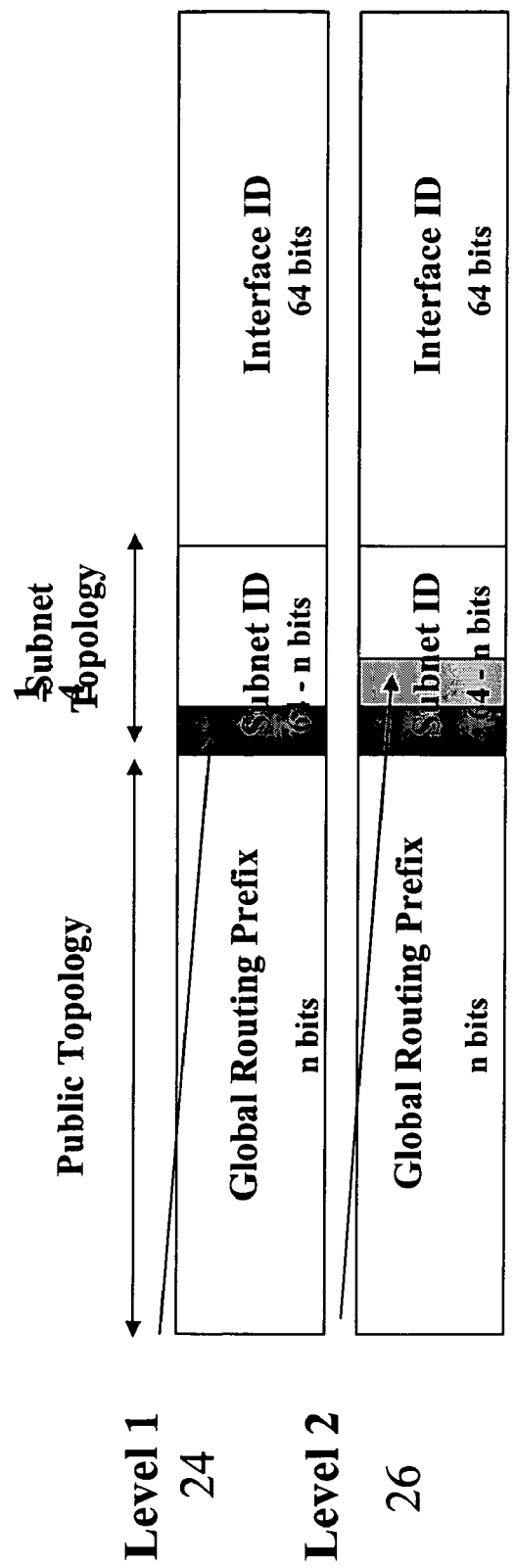

The method of defining address hierarchies is generally performed by the network administrator of the address space. Therefore, while the Regional Internet Registry may control address hierarchy definition in the public topology, network administrators at different sites can use the above described techniques to define address level hierarchies within their sites. FIG. 3B illustrates the definition of multiple address level hierarchies within an organization. Organizations may choose to either route their subnet id 'flat' (by not creating any logical relationship between subnet identifiers, thereby resulting in larger routing tables) or to generate a two or more level hierarchy (thereby resulting in smaller routing tables) in the Subnet ID field. FIG. 3B illustrates two address space mappings, including a two level address hierarchy in an organization. The number of subnets capable of being supported in this manner should be sufficient for most organizations; however, organizations which desire additional subnets may request additional subnet identifiers from their associated service provider or exchange service, and use the additional subnet identifier to generate additional subnets.

Figure 4:
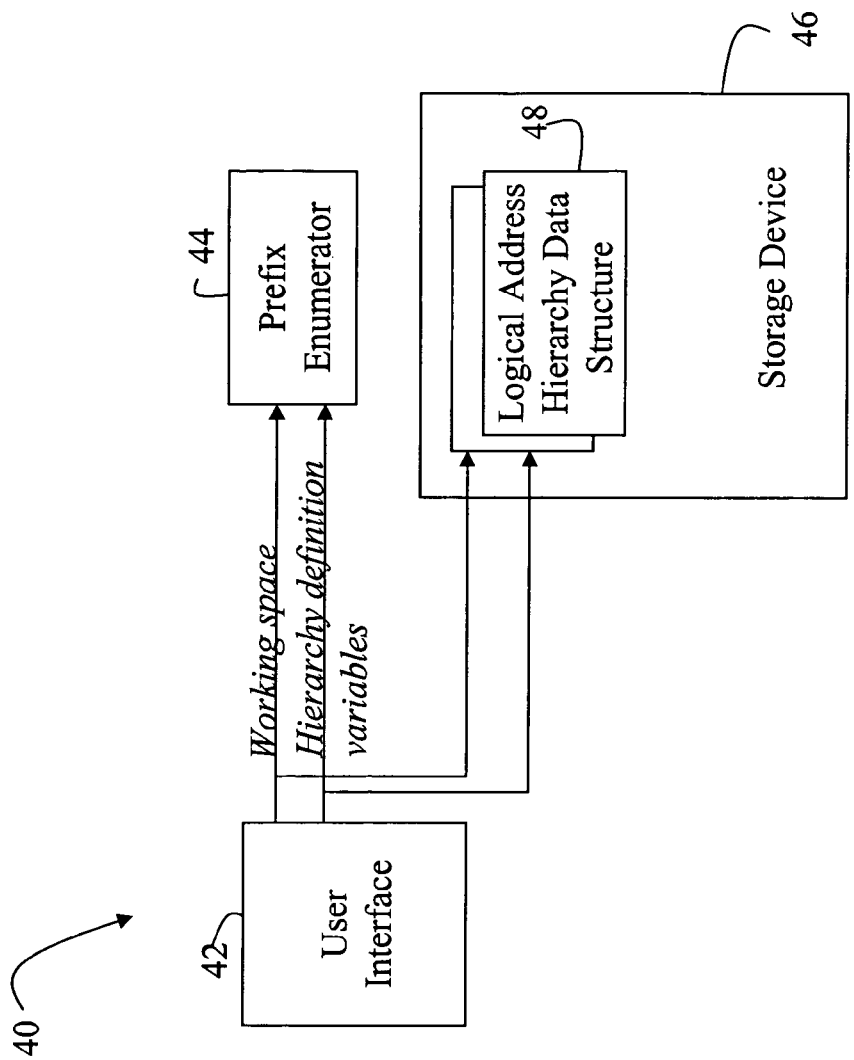
FIG. 4 is a block diagram illustrating several components that may be included in a facility for apportioning an address space into a logical subnet hierarchy.

A facility 40 for use in generating prefixes in a logical subnet hierarchy is shown in FIG. 4 to include a user interface 42, a prefix generator 44 and a storage device 46 for storing one or more logical address hierarchy data structure 48. The user interface 42 may be any type of interface that enables an administrator to identify a working address space and to provide information to define the hierarchy within the address space. Thus, the user interface may be a graphical user interface, command line interface, or other means. The prefix generator enumerates subnet prefixes that are available at each of level of the hierarchy, and may be implemented in software, hardware or any combination thereof. The storage device may be any computer readable medium capable of storing the logical address hierarchy data structure 48.

The logical address hierarchy data structure is used to store the level definition for the address space, including the enumerated prefixes in each level of the hierarchy. As shown in FIG. 4, multiple logical address hierarchy data structures may be generated by a network administrator. As will be described in more detail below, the different local address hierarchies can be used for reconfiguration in the event of disaster recovery or for security purposes.

Figure 5:
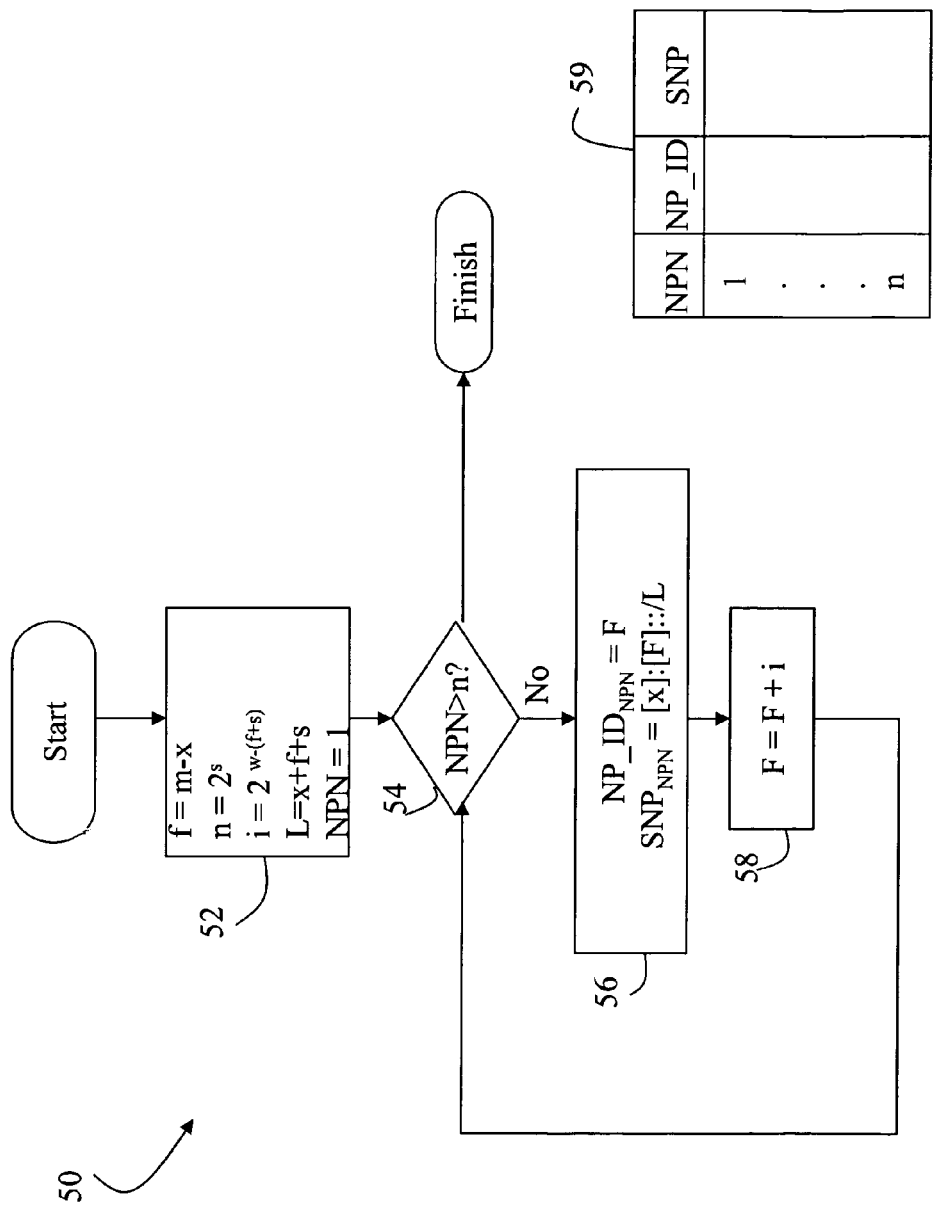
FIG. 5 is a flow diagram illustrating exemplary steps that may be performed to automatically enumerate prefixes in hierarchal levels of a logical subnet hierarchy.

According to one aspect of the invention, prefix enumeration is automatically performed upon the receipt of certain hierarchical variables and factors by the prefix generator. Providing dynamic prefix enumeration drastically reduces the time consumed in the by this task. Exemplary steps that may be performed during a dynamic prefix enumeration process 50 are illustrated in FIG. 5, where F is the Hexadecimal value of a network prefix ID, f is the number of bits used by upper level hierarchies, s is the number of bits allocated to a given hierarchical level, r is the number of remaining levels, m is the sub-netted prefix length, n is the number of prefixes to be obtained, i is the incremental value between subnet IDs, L is the prefix length for new subnetted prefixes, (::/L), w is the number of bits in the working range and x is the established prefix.

At step 52, variables and factors that are used for prefix enumeration are calculated based on known inputs. Thus the number of bits used in upper levels (f) is determined by subtracting the subnetted prefix length (m) from the established prefix (x). The number of prefixes to be obtained (n) is determined by raising 2 to the number of bits allocated to the current level. The incremental value (i) between subnet IDs is calculated by raising 2 to the result of the working range (w) −(the number of bits allocated to upper levels (f)+the number of bits for the current level(s)). The Prefix length for new subnetted prefixes (L) is calculated as the established prefix (x)+the number of bits used for upper levels (f)+the number of bits used for the current level (s). A variable NPN (used to control the population of the table) is initialized to the value 1.

In one embodiment of the invention, the process of prefix enumeration generates a table having three columns; a Network Prefix Number (NPN), a Network Prefix ID (NP_JIP) and a Subnetted Network Prefix (SNP). The table includes 'n' columns (one for each of the prefix numbers 'n' to be obtained).

At step 54 it is determined whether the entire table has been populated by comparing the NPN variable to 'n'. If it is determined that NPN is less than or equal to n, then at step 56 NP_ID NPN is set equal to 'F' and SPN NPN is set equal to [x]:[F]::/L. At step 58, F is incremented by i, and the process returns to step 54, where it is repeated until the entire table has been populated. An exemplary table storing enumerated prefixes for a unique local routing prefix of FC00:4D:C00/38 and generated using the process of FIG. 5 is shown in FIG. 6.

It should be noted that the methods illustrated and discussed with response to FIGS. 5 and 6 are provided by way of example only, and reflect only one method of providing automatic prefix enumeration. The present invention is not limited to any particular manner of enumerating prefixes, rather any other methods which use different variables to provide a similar result may be substituted herein without affecting the scope of the present invention.

Accordingly a method and apparatus has been shown and described that allows a network administrator to flexibly define one or more logical address hierarchies for an address space. The ability to define flexible hierarchies prior to deployment enhances the dynamic aspects of IPv6 without sacrificing routing economy and topology control. These features may provide greater flexibility and control to certain sectors such as military field usage, law enforcement, wireless networking, scientific research and field based industries.

As will now be described in more detail, the logical address space definition may advantageously be linked to a virtual network topology, thereby connecting network elements in the virtual topology via the logical address space, using a virtual network topology design component.

2. Virtual Network Topoloqy Design Component

The virtual network topology component generates an object definition of the routing network elements and their projected memberships at the various levels within the addressing hierarchy. The object definition may be implemented using any object oriented programming method, for example the Common Information Model (CIM) or Extensible Mark-up Language (XML) code. Both XML and CIM provide mechanisms for generating object models and specifying their relationship to provide overall management information in a network/enterprise environment, thereby providing a unified, standard interface to network administrators from a variety of service providers or organizations.

As each virtual routing element is defined, the associated data structures are stored within the system database, thereby allowing for cumulative build of the virtual topology. In addition, as each virtual routing element is defined, a DHARMA tag is created and associated with in the data structure of the associated virtual routing element.

Each DHARMA tag uniquely identifies the virtual routing element with which it is associated. Thus, when the routing element is booted during network deployment, the DHARMA tag can used to obtain connectivity and address hierarchy information stored in the object representation of the routing element. The address hierarchy information is used in turn to assign an appropriate set of IP addresses to the routing element. In addition, according to one aspect of the invention, each DHARMA tag references one or more of the hierarchical levels in the address map defined by the logical address space management component. The tag thus links the virtual topology of the network elements to the logical addressing hierarchy, thereby facilitating control of IP address assignment during network deployment.

Figure 7:
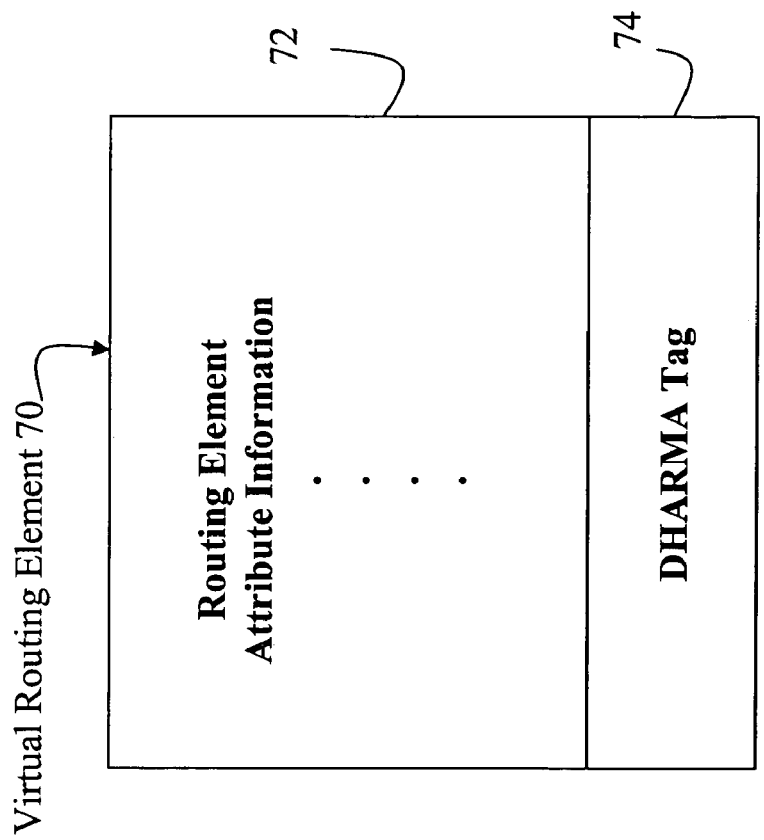
FIG. 7 illustrates exemplary attributes that may be included in a virtual routing element object, including a DHARMA tag of the present invention.

Referring now to FIG. 7, an exemplary virtual routing element object 70 is shown to include attribute data 72 including a DHARMA tag 74. The virtual routing element attribute data may include a variety of routing element attributes, including an IP prefix associated with the routing element, routing protocols executed by the routing element, connectivity information and a Media Access Control (MAC) address of the routing element. The MAC address field would be blank until it is populated by the bootstrap process. Once populated by the bootstrap process, a virtual topology that may be reused by different network deployments) is enabled.

The DHARMA tag is assigned to the virtual routing element by the network administrator based on various characteristics of the virtual routing element including but not limited to its connectivity, type, network policy, traffic type, etc. In one embodiment, behaviours such as projected routing tables and alternate emulated convergence times are used to align virtual routing elements with logical address hierarchy levels. A variety of methods may be used to associate virtual routing elements with hierarchical levels of the addressing space, and the present invention is not limited to any particular method of correlating virtual routing element to the address hierarchy.

Figure 8:
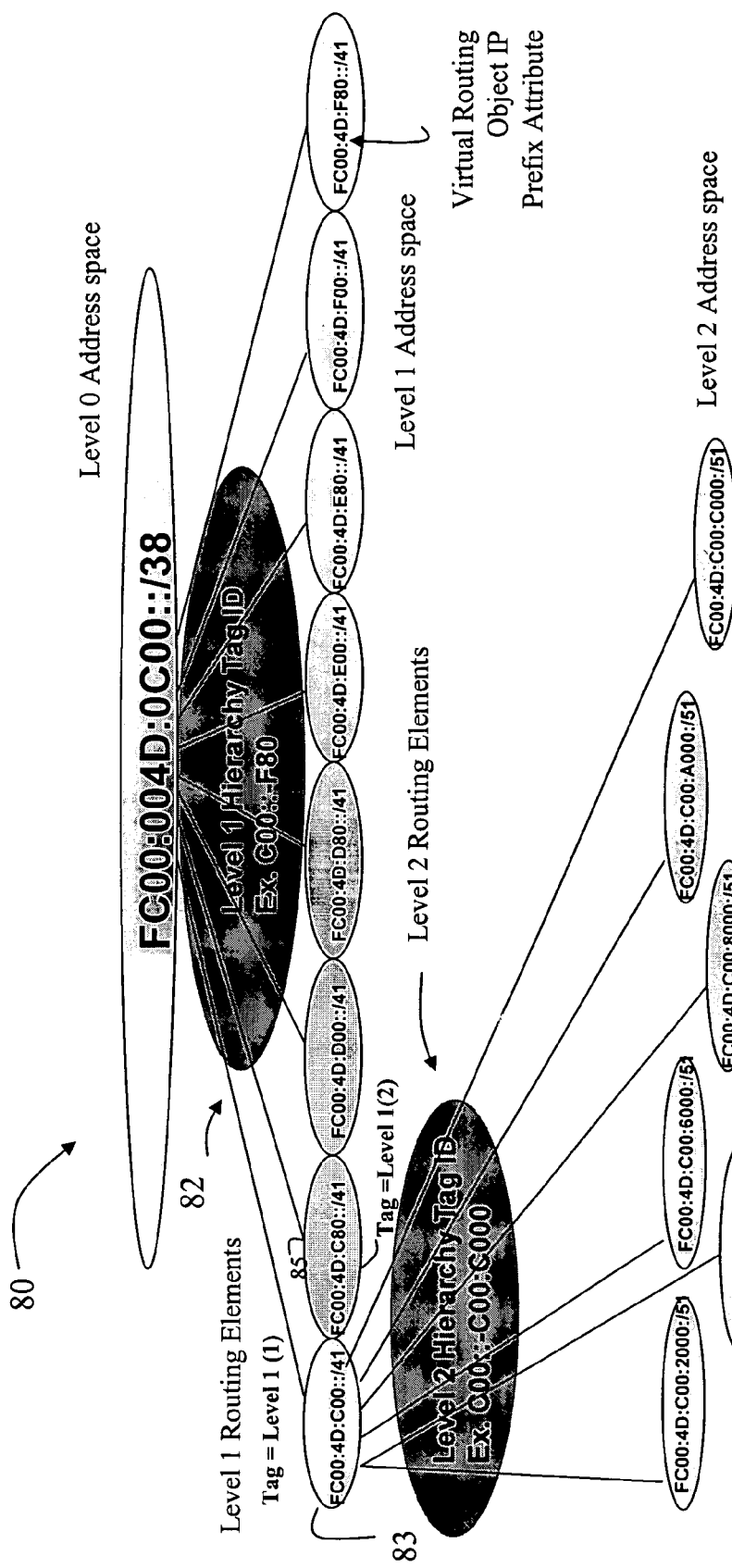
FIG. 8 illustrates a virtual network topology including a plurality of routing element objects such as those of FIG. 7.

FIG. 8 illustrates one example of a virtual network topology 80 that includes virtual routing elements having level associated DHARMA tags. Note that the virtual topology is a projected representation of a network of routing elements that has not yet been deployed. The virtual topology and associated DHARMA labels may be generated at any time (seconds, weeks, months) prior to actual network deployment. The ability to pre-generate a virtual network topology enables a network administrator to provide a variety of virtual topologies based on different, rules of hierarchy behaviour. Fast reconfiguration of deployed networks in the face of modifying rules (cause, for example, by network outages, security protocols or the like) may quickly be provided by re-deployment of the network using the a different pre-defined virtual topology. Thus the present invention can advantageously be used to support wireless and wire-line networks used in a variety of applications, including military applications.

As shown in FIG. 8, when building the virtual topology, the network administrator generates routing element objects for each projected network element. FIG. 8 illustrates both Level 1 virtual routing elements and Level 2 virtual routing elements. According to one embodiment, each virtual routing element is allocated a DHARMA tag which uniquely identifies the routing element and associates the virtual routing element with a level in the address hierarchy. For example, virtual routing element 83 is shown including a DHARMA tag of Level 1(1), and virtual routing element 85 is shown including a DHARMA tag of Level 2(1). In one embodiment, the DHARMA tag may be one of the enumerated prefixes generated for the level. In an alternate embodiment, one of the enumerate prefixes generated for the level is stored as an attribute of the virtual routing element. Thus, in FIG. 8, the Level 1 Hierarchy tag is C00:-F80, and the virtual routing element IP prefixes range from FC00:4D:C00::/41 to FC00:4D:F80::/41 in the level 1 address space and at least one interface in the level 0 address space (FC00:004D:0C00::/38). Virtual routing elements that are coupled to virtual routing element 83 are Level 2 virtual routing elements 84. The Level 2 IP enumerated IP prefixes (or tags) of these Level 2 routing elements 84 are generated based on the IP prefix or tag of the parent device, augmented by spaced prefixes in a Level 2 prefix range between C00::-C00:C000. As in the case of the level 1 routed elements. The level 2 routed elements have at least one interface assigned to the level 1 address space. As a result two levels of hierarchy are implied; one which is that of the address space and the other which is that of the routed elements that connect the address space together.

As stated above, in the embodiment of FIG. 8, the DHARMA tags may be the enumerated IP prefixes of devices at the appropriate level, although this is not a requirement of the invention. However, it is not required that DHARMA tags be allocated in this manner. Because DHARMA tags are merely a label, any tag that uniquely identifies the virtual routing element may be used. It is not necessary that the level information or IP prefix be included within the DHARMA tag; rather, in an alternate embodiment a separate table may be maintained which stores level information and/or IP prefix information for each DHARMA tag. Other methods of associating a level with a tag may be substituted herein without affecting the scope of the invention.

While FIG. 8 illustrates a two level virtual topology, it is appreciated that the virtual topology may be mapped to as many levels as there are in the defined. address space. It is envisioned that both the logical address space hierarchy data structure as well as the virtual topologies are modifiable to add or remove levels as depending upon changing network requirements.

Once the virtual topology has been generated, it may be stored in a data structure until network deployment. In one embodiment, the virtual topology is stored with a bootstrap temporary IPv6 that serves as a deployment label. The deployment may advantageously be password protected. When the network is to be deployed the deployment is accessed and the DHARMA tags are passed to a policy broker or other entity to initiate the network deployment component of the DHARMA process.

3. Network Deployment Component

Figure 9:
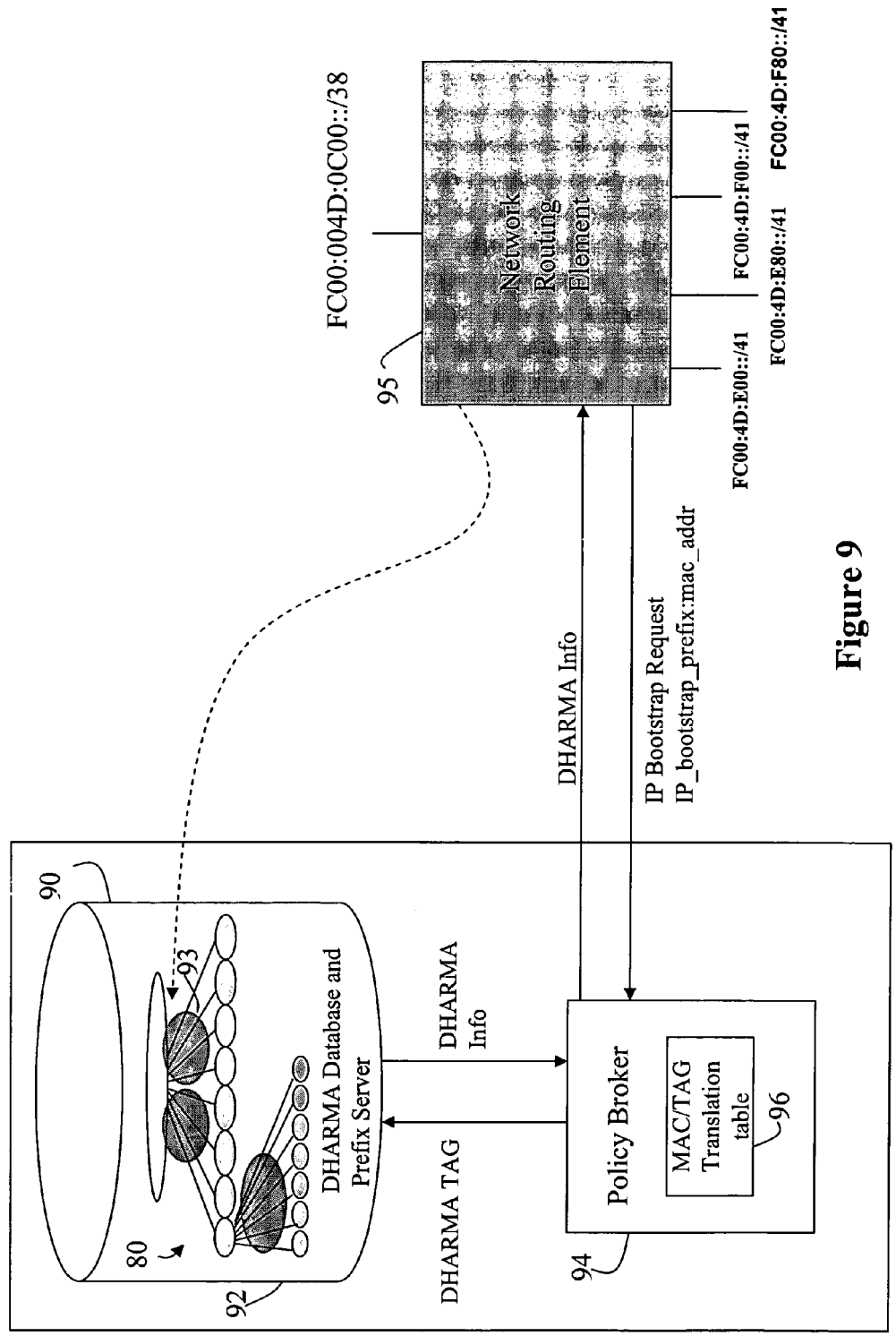
FIG. 9 is a diagram illustrating several components of a DHARMA system that are used for deploying a DHARMA defined network.

FIG. 9 illustrates several components that may be used in a network deployment component 90 of the DHARMA process, including a policy broker 94 and a DHARMA database and Prefix server 96. The DHARMA database and Prefix server 96 stores one or more virtual topology databases 80, such as those described in FIG. 8. The Policy Broker is a system manager or other Operations, Administrative and Maintenance (OAM) entity that controls the retrieval of IP prefixes from the DHARMA database. In one embodiment of the invention, the policy broker serves as an interface between physical network elements and the virtual network topology, and assists in the retrieval of physical IP addresses for interfaces of network elements.

The Policy Broker is shown to include a Media Access Control (MAC)/DHARMA tag translation table 96. As will be described in more detail below, at the initial stages of deployment, the DHARMA tag and associated MAC address of each virtual object are stored in the translation table 96. Subsequent boot requests, received by the policy broker in which the associated MAC address or other unique identifier is presented, will cause the table to be accessed to retrieve DHARMA tag information, thereby associating the physical address of the routing element to the virtual representation of the object. The policy server is shown in FIG. 9 to be coupled to the DHARMA data structure for forwarding DHARMA tags to the data structure and for receiving DHARMA information in response to the DHARMA tag, wherein the information includes IP address information which is passed back to the network element 95.

Figure 10:
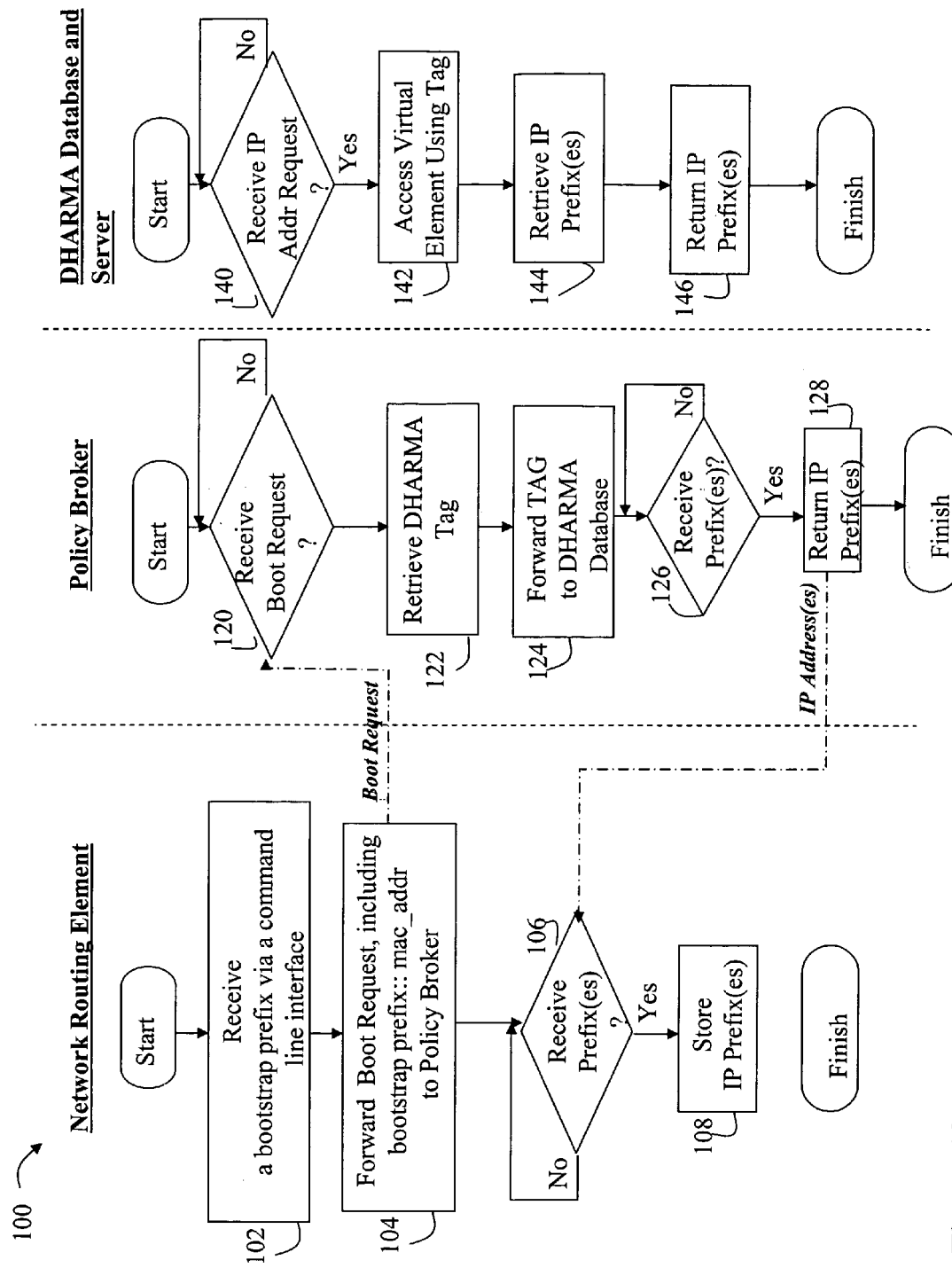
FIG. 10 is a flow diagram provided to illustrate exemplary steps that may be performed by a network element, policy broker and DHARMA data structure and prefix server supporting the present invention.

Referring now to FIG. 10, a flow diagram is provided which illustrates exemplary steps that may be performed by each of the network routing element 95, policy broker 94 and DHARMA database and prefix server 92 in a process 100 that assigns IP prefixes to network elements in accordance with a logical address hierarchy. At step 102, the network element receives an IP bootstrap prefix, for example via a command line interface. At step 104 the element 95 appends the IP bootstrap prefix to its own MAC address, and forwards the boostrap_prefix::mac_address pair to the policy broker 94 as part of a boot request. The network element process then proceeds to step 106 to await return of one or more IP prefixes in response to the boot request (where an IP prefix may be returned for each interface of the network element).

At step 120, the policy broker 92 receives the boot request, and at step 122 uses the MAC address or other unique identifier in the boot request to access translation table 96 to retrieve a DHARMA tag. At step 124, the DHARMA tag is forwarded to the DHARMA database and Prefix server 92, and the policy broker process proceeds to step 126 to await return of prefix information.

At step 140, the DHARMA database and prefix server 92 receives the DHARMA tag, and accesses the virtual object associated with the tag (step 142) to retrieve IP prefix information (step 144). In one embodiment, a modified prefix server responds back to the routing network element with 'x' DHCPv6 responses which would correspond to 'x' routed network interfaces within the routing network element. The system would provide for ability to set the full IPv6 address, including the interface portion or it could alternatively allow for the MAC address of the routed interface to provide these values. The IPv6 addresses (or prefixes as the case may be)

would correspond directly to the routing network elements virtual membership with the topology database. The prefix information is then returned to the policy broker at step 146. The policy broker returns the prefix information to the network routing element at step 128, and the network routing element stores its IP prefixes at step 108.

Figure 11:
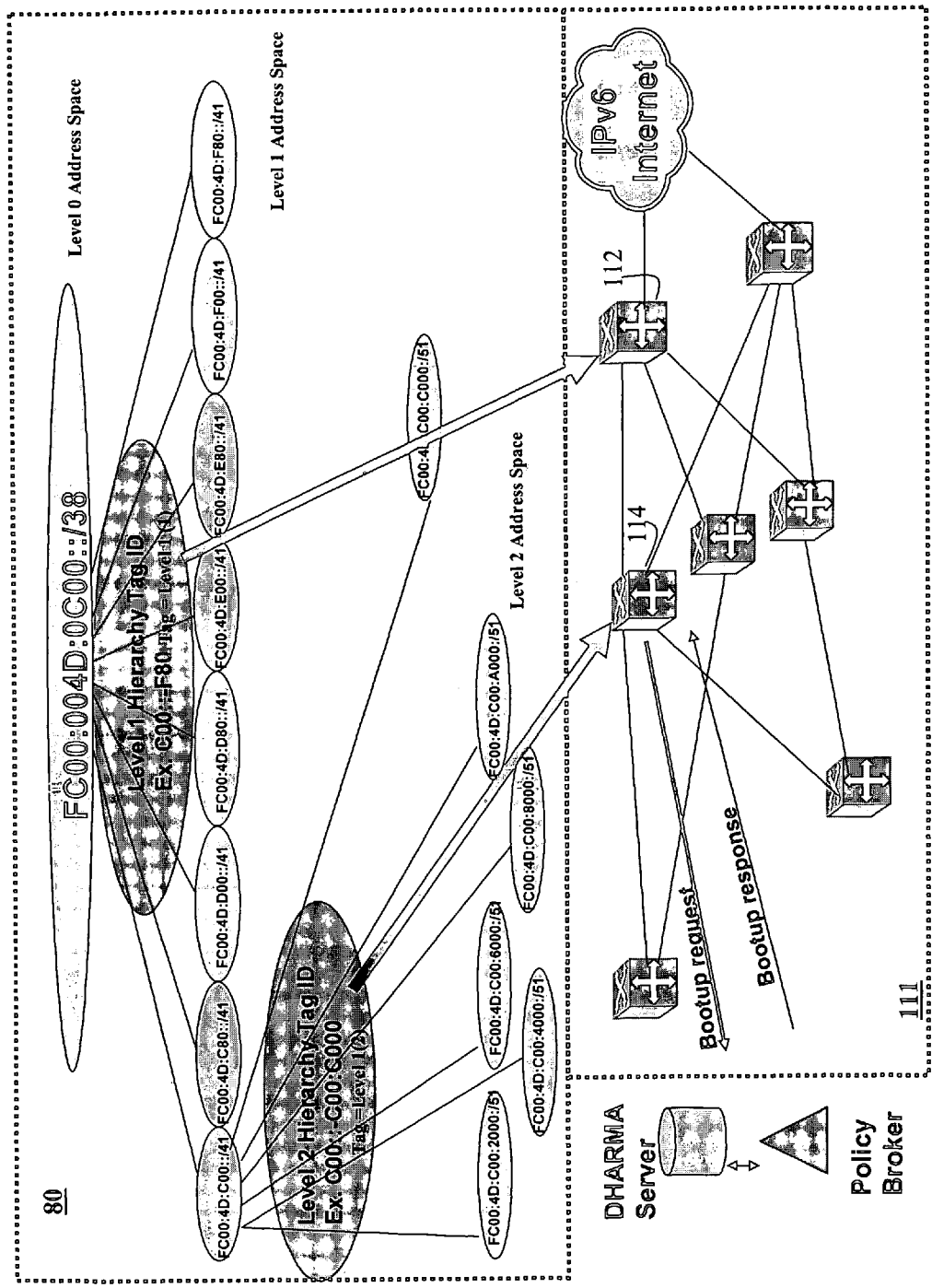
FIG. 11 is a network diagram provided to illustrate the relationship between a deployed physical network and a virtual network topology such as that of FIG. 8.

FIG. 11 pictorially illustrates the relationship between the virtual topology 80 and a physically deployed network 111 having IP prefixes assigned in accordance with the virtual topology. Network elements such as element 112 (level 1 routed elements) are assigned IP prefixes selected from the Level 0 and 1 hierarchy, while network elements such as element 114 (level 2 routed elements) are assigned Level 1 and 2 prefixes.

According to one embodiment of the invention, the policy broker may be implemented in CIM/XML as a control module capable of querying the network elements for MAC addresses. IP prefix information can then be retrieved using methods similar to those provided in FIG. 10.

4). Network Management

The above components provide allow for network configuration and deployment. However, changes in the network environment may necessitate network reconfiguration. In one embodiment of the invention, the policy broker includes monitoring logic which monitors the deployment status of the network to performance degradation, environmental differences or other outages in the network. In response to the detection of failures in the deployment, the policy broker may determine that a reconfiguration is required.

In some scenarios it may be beneficial to define multiple hierarchies which map to the same virtual topology, (and hence the same DHARMA tags), referred to hereinafter as 'multi-netting'. The multiple hierarchies may be defined well in advance of the network deployment. The multiple hierarchies can be used concurrently with a policy detailing the fold over between hierarchies or may be held as back up positions to be implemented manually or with their use triggered by a specific event. In some situations, such as the networked battlefield, it may be beneficial to change the hierarchy used periodically (e.g. every 6 hours) or it may be necessary if an important routing element fails or otherwise ceases to operate.

In order to change between hierarchies, a physical routing element may be assigned to multiple hierarchies. When changing between hierarchies it may be necessary to use address prefix renumbering according to a predefined policy. If an important node is no longer functioning, policy based renumbering can be used to dynamically adapt to this.

Figure 12:
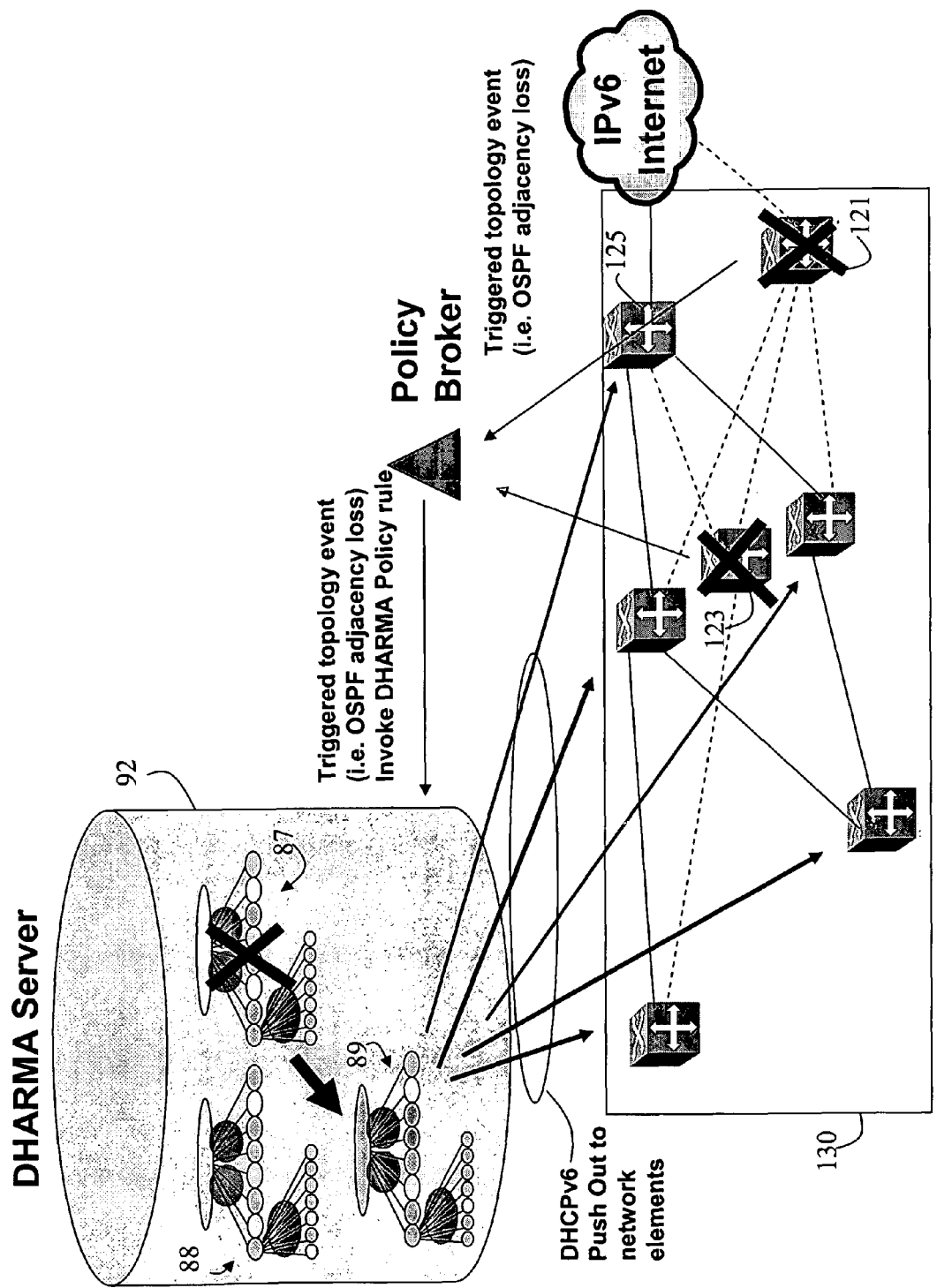
FIG. 12 illustrates how the provision of multiple virtual topologies may be used to support prefix renumbering in the event of a loss of a network element.

FIG. 12 is a network diagram provided to illustrate the triggering of, and handling of, prefix renumbering in a DHARMA network. IP prefixes in the network 130 are originally assigned in accordance with the virtual topology 87 stored in the DHARMA database and prefix server 92. When a triggering topology event, such as a network element loss, is detected, network connectivity is lost. The Policy Broker 94 invokes a policy rule to implement prefix renumbering to restore connectivity. The DHARMA database pushes updated IP prefixes out to network elements, for example using a DHCPv6 push command.

The prefix renumbering method illustrated in FIG. 12 may be used, for example, to support mobile networks. As devices move out of range, and connectivity is lost, prefix renumbering using the above method may restore connectivity to the network. Prefix renumbering may also be performed to periodically switch between the prefixes associated with the virtual topologies 87, 88 and 89 to support a sequential renumbering policy, which may be implemented to address security concerns in the network. A benefit of preparing multiple hierarchies in advance is that the changes between hierarchies can occur in a predictable way. These changes can be modelled in advance.

Accordingly, a novel address resource architecture has been shown and described that coordinates a logical hierarchy of address spaces with a virtual topology of network elements using a manageable database environment. Address spaces may be apportioned into hierarchical levels to contextually map policies to routing topology. The hierarchical network modelling capabilities described above can be applied to any IPv6 addressing system (transition or native), or alternatively to IPv4 or other addressing protocol. Because the relationship of the routing network element to the address space data structure is implicit via the DHARMA tag, all systems, transitional and otherwise, may leverage a common data structure. Tunnel brokers may refer to the DHARMA data structure in the assignment of the brokered prefixes. Such an approach would allow for hierarchical transition topology overlays that could work in conjunction with normal global routing prefix infrastructures.

DHARMA thus provides for a true next generation approach that allows for tightly engineered yet fully dynamic networks. Immediate sectors that would find DHARMA invaluable are force protection systems for the networked battlefield deployments. Field based scientific research nodes could also use DHARMA. Wireless providers will find a great deal of value in DHARMA in that it would allow for tightly controlled provisioning models that can strongly leverage on route summarization and optimization. As IPv6 becomes more common in the commercial enterprise space, DHARMA would be the expected facility and would work in tandem with DNS6 and DHCPv6 systems for normal OAM operations. Because of the implicit knowledge method, the enterprise would be able to not only manage the IPv6 addressing space and the routed infrastructure but any transition methods or associated broker services as well. DHARMA thereby would become the expected standard boot process for routed network elements within IPv6 networks.

Having described various embodiments of the invention is will be appreciated that the above description and figures are merely illustrative of features and functions of the present invention. Although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software running on a computer, or a combination thereof.

Many of the above figures are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem.

In summation, while the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

What we claim is:

1. A method of allocating addresses to network elements in a network includes the steps of:
    modeling the network by:
        apportioning an address space associated with the network into a plurality of hierarchical levels other than a Top-Level, Next-Level and Site Level; and
        generating a virtual topology map of the network, the virtual topology map comprising a plurality of virtual network objects, each virtual network object representing a network element and including a tag and prefix information associated with one of the plurality of hierarchical levels of the address space, the tag being assigned based on at least one characteristic of the network element with respect to connected segments; and
    deploying the network element by utilizing the tag to obtain an address,
    whereby addresses are allocated to network elements based on the respective characteristics of those network elements.

2. The method according to claim 1 wherein said deploying step includes the steps of:
    receiving a boot request from the network element requesting membership in the network;
    identifying the tag associated with the network element;
    accessing the virtual topology map using the tag to retrieve the prefix information associated with the tag; and
    forwarding the prefix information to the network element.

3. An apparatus for allocating addresses to devices in a network comprising:
    a physical node that models the network, the node including:
        a logical address hierarchy tool enabling a user to apportion an address space into a plurality of hierarchical levels other than a Top-Level, Next-Level and Site Level;
        a virtual network topology generator enabling a user to build a virtual network topology comprising a plurality of network element objects, each network element object representing a network element and including a tag linking the object to one of the plurality of hierarchical levels, the tag being assigned based on at least one characteristic of the network element with respect to connected segments; and
        an interface for deploying the network element by utilizing the tag to obtain an address,
    whereby addresses are allocated to network elements based on the respective characteristics of those network elements.

4. The apparatus of claim 3 further comprising:
    a network deployment tool, operating in response to boot commands from a network element requesting membership in the network to forward an address prefix to the network element to deploy the network element, the address prefix retrieved from the virtual network topology.

5. The apparatus of claim 4, wherein the virtual topology generator generates a plurality of virtual topologies, and wherein the apparatus further comprises:
    a network management component adapted to redeploy the network element in response to a trigger condition using different virtual topologies from the plurality of virtual topologies.

6. The apparatus of claim 5, wherein the trigger condition is a time period.

7. The apparatus of claim 5, wherein the trigger condition is a detected loss of one or more elements in the network.

8. A method for generating a virtual network topology comprising:
    populating a plurality of routing element objects with attribute information, the attribute information of each routing element object representing a network device and including a tag associating the routing element object with a level in an address space hierarchy other than a Top-Level, Next-Level and Site Level, the tag being assigned based on at least one characteristic of the network device with respect to connected segments and being used to deploy the network device by using the tag to obtain an address.

9. The method of claim 8, wherein the tag includes an identifier of the level in the address space.

10. The method of claim 8 wherein the tag includes an address prefix associated with the level in the address space.

11. The method of claim 8 including the step of storing the plurality of routing element objects in a database.

12. The method according to claim 11, wherein the database is password protected.

13. The method of claim 8 including the step of storing a bootstrap prefix with the plurality of routing element objects.

14. A computer program product stored on a non-transitory computer readable medium said computer program product adapted to be executed to implement a method for allocating addresses to devices in a network, said method comprising:
    generating a data structure including a plurality of routing element objects, each routing element object representing a network device and including a tag associating the routing element object with a level in an address space hierarchy other than a Top-Level, Next-Level and Site Level, the tag being assigned based on at least one characteristic of the network device with respect to connected segments and being used to deploy the network device; and deploying the network device by utilizing the tag to obtain an address.

15. The computer program product of claim 14, wherein generating the tag includes generating an identifier of the level in the address space.

16. The computer program product of claim 14 wherein generating the tag includes generating an address prefix associated with the level in the address space.

17. The computer program product of claim 14, wherein generating the data structure further comprises generating a bootstrap prefix.

18. A method of obtaining an address prefix for a network element seeking membership in a network includes the steps of:
   receiving a bootstrap request from the network element, the bootstrap request including a bootstrap prefix and a Media Access Control (MAC) address of the network element;
   indexing a translation table using the MAC address to map a tag associated with a virtual representation of the network element, the tag linking the virtual representation of the network element to one of a plurality of levels in an address hierarchy of an address space of the network other than a Top-Level, Next-Level and Site Level, and the tag being assigned based on at least one characteristic of the network element with respect to connected segments, wherein the tag is neither a MAC address nor an IP address; and
   forwarding the tag to a prefix server to retrieve one or more prefixes associated with the tag.

19. A policy manager comprising:
   a network device including:
      a translation table for converting a MAC address received from a network element to a tag, the tag identifying a virtual routing element object in a virtual topology, and the tag being assigned based on at least one characteristic of the network element with respect to connected segments, wherein the tag is neither a MAC address nor an IP address nor a Top-Level Aggregation Identifier, nor Next-Level Aggregation Identifier, nor Site Level Aggregation Identifier; and
      means for forwarding the tag to a prefix server to retrieve one or more prefixes for the network element.

* * * * *